United States Patent [19]

Sørensen

[11] 3,983,907

[45] Oct. 5, 1976

[54] VALVE DEVICE, ESPECIALLY FOR AIR CUSHIONS

[75] Inventor: Elo Sørensen, Espergaerde, Denmark

[73] Assignee: Carmo Handels- og Industri A/S, Denmark

[22] Filed: Dec. 31, 1975

[21] Appl. No.: 645,632

[30] Foreign Application Priority Data
July 8, 1975   Denmark .......................... 3084/75

[52] U.S. Cl. .......................... 137/223; 137/516.15
[51] Int. Cl.² .......................................... F16K 15/20
[58] Field of Search ...... 137/223, 224, 226, 516.15; 46/90

[56] References Cited
UNITED STATES PATENTS

| | | | |
|---|---|---|---|
| 511,706 | 12/1893 | Lamplugh | 137/224 |
| 2,854,018 | 9/1958 | Kilmarx | 137/223 |
| 3,410,299 | 11/1968 | Whittington | 137/223 |
| 3,491,786 | 1/1970 | Crossman | 137/226 |

*Primary Examiner*—Harold W. Weakley
*Attorney, Agent, or Firm*—Hill, Gross, Simpson, Van Santen, Steadman, Chiara & Simpson

[57] ABSTRACT

A valve device, especially for an air cushion of plastic sheet, said device having a first portion which is adapted to be mounted in an aperture in the wall of the cushion, said first portion having a relatively large bore which is adapted to constitute an outlet for emptying the air cushion, a second portion of the valve device being adapted to be screwed into the bore in the first portion, the two portions having valve surfaces which are adapted to close the bore airtightly when the second portion is screwed completely into the bore, a relatively small air passage in the second portion adapted to constitute an inlet for pressurized air during inflation of the air cushion, a non-return valve in said air passage, and stop means at the outer end of said second portion adapted to prevent the second portion's becoming completely detached from the first portion.

5 Claims, 5 Drawing Figures

VALVE DEVICE, ESPECIALLY FOR AIR CUSHIONS

BACKGROUND OF THE INVENTION

1. Field of the Invention

The invention relates to a valve device, especially adapted for use in air cushions of plastic sheet.

2. Prior Art

Such valve devices are used, for example, in air cushions which are adapted to be arranged as buffers between articles which are packed for shipment, or for inflatable rubber boats etc. Known valve devices of this type have relatively many parts, and some parts can get lost. Even if retaining strips are used to connect the parts with each other, such strips may be broken, and therefore the known devices are not completely safe in this respect.

SUMMARY OF THE INVENTION

The valve device according to the invention has a threaded housing for being mounted in a cushion aperture and has a valve member which is to be inside the air cushion. The closing member has a valve portion which is in a closing position when it is screwed maximally out of the air cushion and then is urged against a valve seat surrounding the inner end of the threaded bore. The closing member has axially extending passages which, when the closing member is screwed maximally into the cushion, connect the inner space of the air cushion with the outer atmosphere for fast flow. The closing member has stop means on its outer end which co-operate with the housing in such a way that the closing member is prevented from being screwed completely out of the housing into the inner space of the air cushion. A smaller air passage extends through the closing member and has a one-way valve therein for pressurizing the cushion.

A device of this construction comprises relatively few parts, and none of the parts can get lost.

It is especially advantageous that the valve seat is situated inside the air cushion and therefore is not inclined to be smudged or damaged, so that wear and lack of tightness caused by dirt is prevented.

The axial cavities in the closing member and the stop means may be constructed in various ways which may be advantageous under various circumstances.

Many other advantages, features and additional objects of the present invention will become manifest to those versed in the art upon making reference to the detailed description and the accompanying drawings in which preferred structural embodiments incorporating the principles of the present invention are shown by way of illustrative example.

AS SHOWN ON THE DRAWINGS

Figure 1:
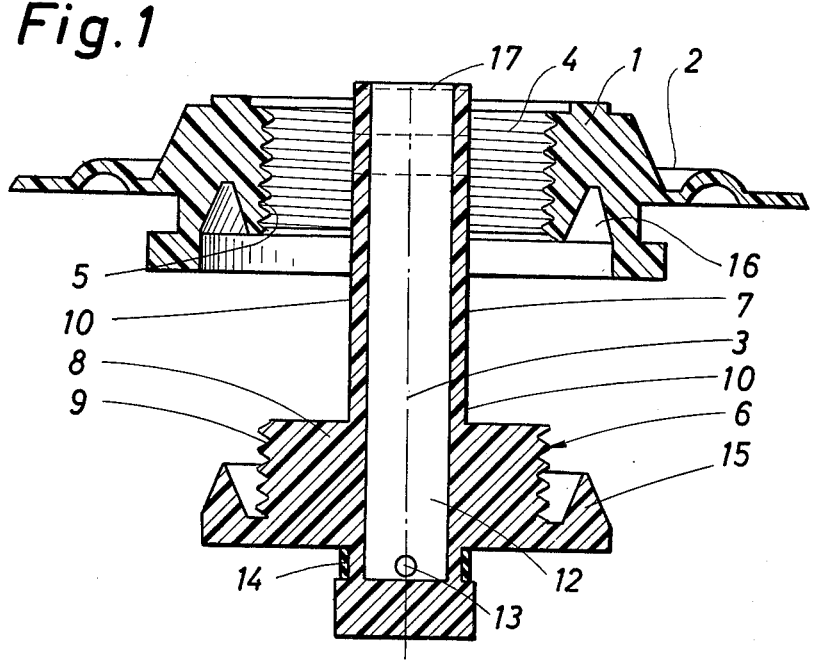
FIG. 1 shows a cross-section through a valve device according to the invention in open condition.
Figure 2:
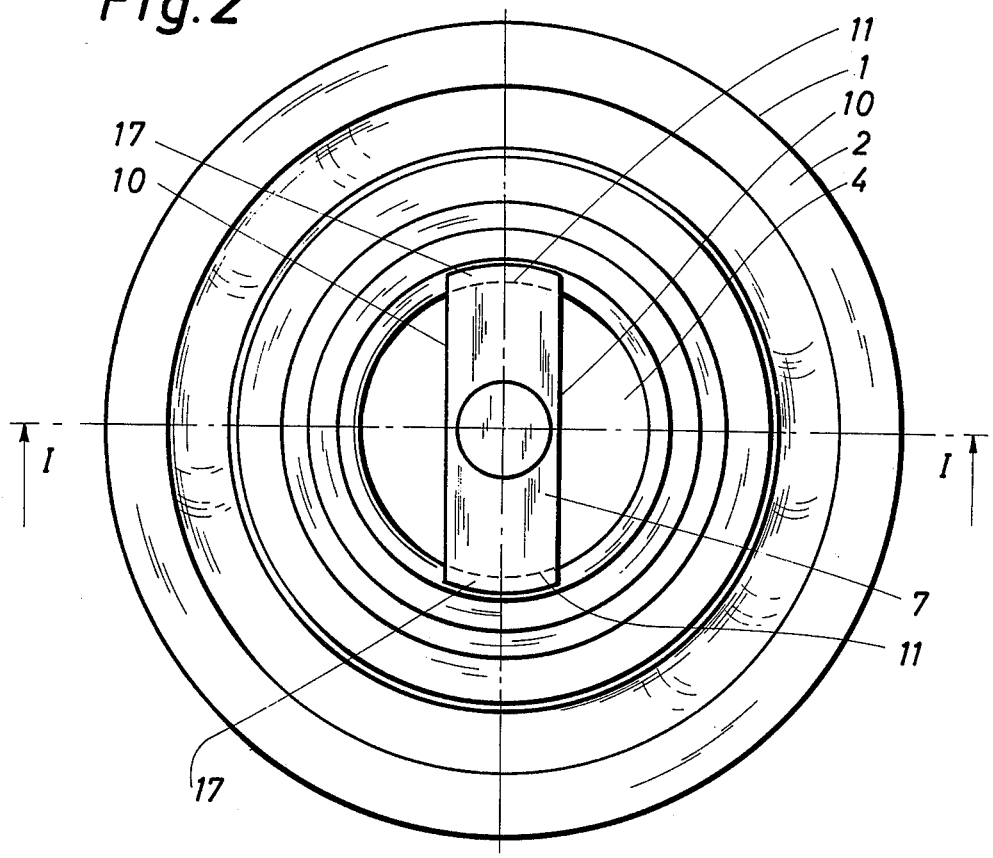
FIG. 2 shows a plan view of the same device.

The valve device shown in FIGS. 1 and 2 has a housing 1 which is shaped like a solid of revolution. From its peripheral surface, a flange 2 extends which is substantially perpendicular to the axis 3 of the solid of revolution and is adapted to be heat sealed or glued to the portion of the wall of an air cushion (not shown) which surrounds an aperture in the wall when the middle portion of the housing is positioned in the aperture.

The housing 1 has a bore 4 with internal threads 5 into which a closing member 6 is screwed, the closing member 6 having a spindle portion 7 extending from a cylindrical portion 8 which has external threads 9 corresponding to the threads 5. The portion 7 is so made that two diametrically opposite portions of the cylindrical portion 8 are cut away, so that the portion 7 remains which is bounded by two parallel surfaces 10 and two partial cylinder surfaces 11 which are provided with partial threads 9.

The closing member 6, 7 has a channel or small passage 12 which is open at the top and closed at the bottom, a cross-hole 13 being provided immediately above the bottom, the hole 13 being covered by an elastic annular strip 14 which encloses a portion of the closing member 6, so that a non-return or check valve is provided. The upper end of the passage 12 is adapted to be connected to a high pressure pump by conventional means (not shown).

The portion 8 is surrounded by an annular protrusion 15 constituting a valve body which is adapted to engage an annular groove or seat 16 in the housing 1 surrounding the end of the threaded bore 4.

At the top, the portion 7 has two flanges 17 extending radially beyond the thread 9 and constituting a stop means which prevents the closing member 6 from being screwed completely out of the housing 1 and into the air cushion. The closing member 6 is made of a plastic material, so that the flanges 17, when the closing member is heated, may be so flexed that they can be pressed through the threaded bore 4 when the device is assembled.

The valve device functions in the following way:

In the closed position of the valve device, the closing member 6 is screwed upwardly in the thread 5 until the valve member 15 tightly engages the seat surfaces in the groove 16, in which position no air can pass through the bore 4 or the passage 12 from the lower end, which is positioned in the space in the air cushion, to the upper end which is positioned outside the air cushion.

When the air cushion is to be inflated, the upper end of the passage 12 is connected to an air pressure source, and the pressurized air will open the non-return or check valve 13, 14 so that the air can flow into the space in the air cushion. When the cushion is to be emptied, the closing member 6 is screwed downwardly, e.g. to the position shown in FIG. 1, and then an outlet is established having a relatively large cross-sectional or flow area, so that the air cushion can be quickly emptied.

Figure 3:
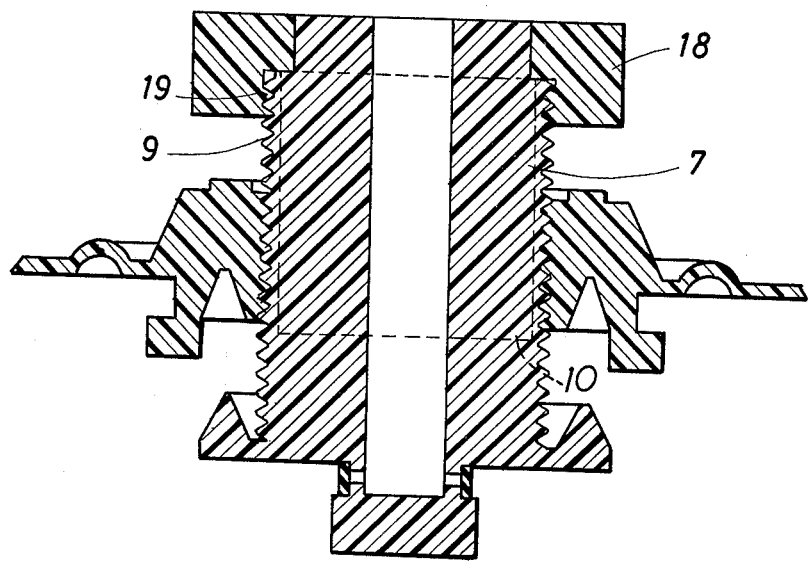
FIG. 3 shows the same as FIG. 1 for a modified device.

The valve device according to FIG. 3 is largely constructed like the device according to FIGS. 1 and 2, but instead of the flanges 17 which act as stop means, a handle member 18 is provided on the outer end of the spindle member 7, which handle member 18 acts as stop member and as a handle when the closing member 6 is to be rotated. The handle member 18 may be mounted in various ways. According to FIG. 3 the handle member 18 has inner threads 19 which are screwed onto the thread 9 on the closing member 6, and the member 18 may be fixed by means of a screw (not shown).

Figure 4:
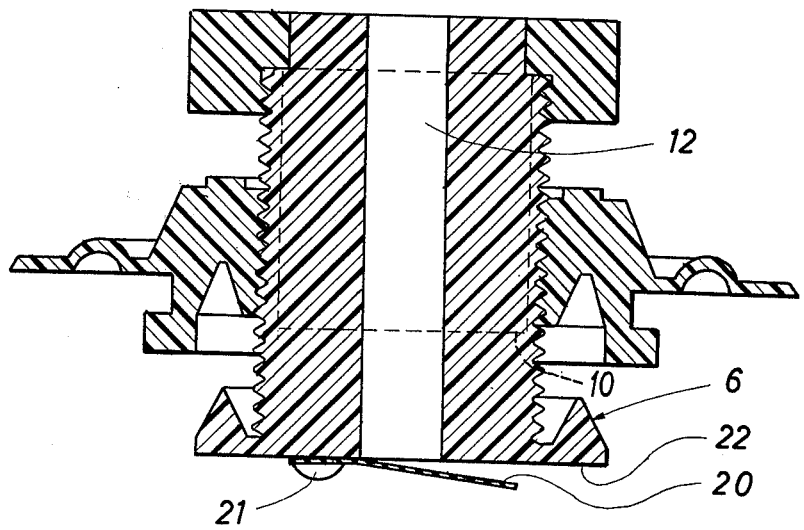
FIG. 4 shows the same as FIG. 1 for a further modified device.

FIG. 4 illustrates a modification for the valve device according to the invention constructed as shown in FIG. 3, but instead of a non-return valve as described in relation to FIG. 1, a non-return or check valve comprising an elastic bendable valve flap 20 is provided, mounted on the bottom end of the closing member 6 by means of a screw or a rivet 21. A pressure in the inner space of the air cushion will press the flap 20 against the underside 22, and a pressure in the passage 12 will open the flap, as shown in FIG. 4.

Figure 5:
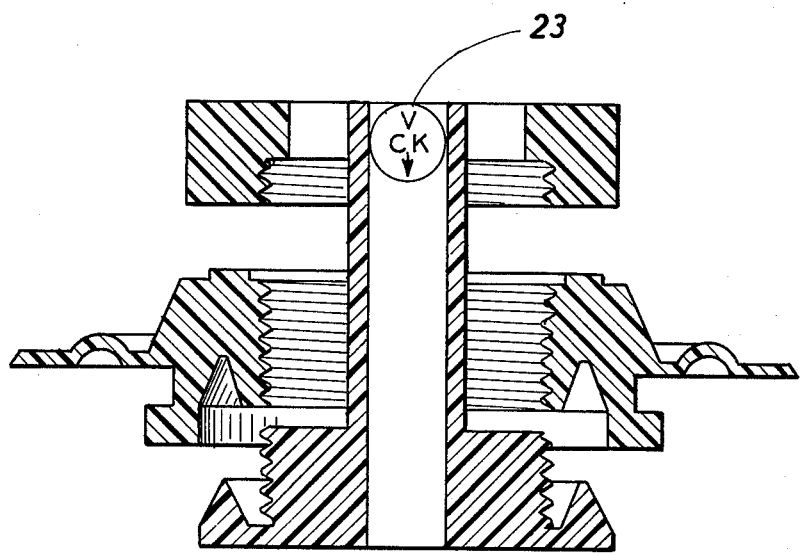
FIG. 5 shows the same as FIG. 1 for a third modification.

FIG. 5 illustrates a valve device which is constructed substantially as shown in FIG. 4, but the non-return or check valve (shown diagrammatically) comprises a valve insert 23 of the known type which is used in motorcar tires.

Although various minor modifications might be suggested by those versed in the art, it should be understood that I wish to embody within the sope of the patent warranted hereon all such embodiments as reasonable and properly come within the scope of my contribution to the art.

I claim as my invention:

1. A valve device for an air cushion of sheet material, comprising:
   a. a housing for being disposed in an aperture in the air cushion, and having an annular mounting flange for being secured to the sheet material, said housing having a bore with internal screw threads, and a valve seat surrounding the inner end of said bore;
   b. a threaded closing member carried in said bore, said closing member having a passage therethrough with a non-return valve therein, said closing member having an operating portion extending through said bore to be outside the air cushion, said closing member having a valve portion for being disposed inside the air cushion and sealingly engageable with said seat when the closing member is in its outermost position, there being at least one axially extending passage therein for venting the interior of the cushion to the atmosphere when said valve portion is unseated; and
   c. stop means secured to the outer end of said operating portion and engageable with said housing to preclude the closing member from being completely unscrewed from said threads.

2. A valve device according to claim 1 in which said closing member has a cylindrical portion from which said operating portion extends, said operating portion having at least one partial cylindrical surface which is threaded into said bore by which partialness said one axially extending passage is provided.

3. A valve device according to claim 1 in which said closing member has a cylindrical portion which is partially cut-away to provide two oppositely facing flat surfaces separated by two oppositely facing partial-cylindrical threaded surfaces therebetween.

4. A valve device according to claim 1 in which said stop means is an annular handle portion secured to the outer end of said closing member.

5. A valve device according to claim 1 in which said stop means comprises at least one flange portion at the outer end of said closing member, said flange portion being deflectable in response to heat to enable passage through said threaded bore on assembling of said closing member into said threaded bore.

* * * * *